United States Patent [19]

Kurihara et al.

[11] Patent Number: 4,885,692
[45] Date of Patent: Dec. 5, 1989

[54] CRUISE CONTROL SYSTEM

[75] Inventors: Norimitsu Kurihara; Masahiko Asakura, both of Saitama, Japan

[73] Assignees: Honda Giken Kogyo K.K.; Mitsuba Electric Mfg. Co. Ltd., both of Japan

[21] Appl. No.: 233,641

[22] Filed: Aug. 18, 1988

[30] Foreign Application Priority Data

Aug. 20, 1987 [JP] Japan ................................. 62-207244

[51] Int. Cl.⁴ ............................................. B60K 31/04
[52] U.S. Cl. ................................. 364/426.04; 123/352; 180/179
[58] Field of Search ...................... 364/426.04, 431.07; 123/352, 361; 180/176, 179

[56] References Cited

U.S. PATENT DOCUMENTS

| | | | |
|---|---|---|---|
| 4,345,663 | 8/1982 | Shields | 180/179 |
| 4,352,402 | 10/1982 | Collonia | 180/176 |
| 4,612,615 | 9/1986 | Murakami | 123/361 |
| 4,656,407 | 4/1987 | Burney | 123/352 |
| 4,747,460 | 5/1988 | Tomoshige et al. | 180/176 |

Primary Examiner—Gary Chin
Attorney, Agent, or Firm—Skjerven, Morrill, MacPherson, Franklin & Friel

[57] ABSTRACT

A vehicle cruise control system having an electric actuator for acting upon a throttle valve of a vehicle, a clutch for disconnecting the actuator from the throttle valve, a spring or the like for returning the output end of the clutch to a neutral state and a limit switch for detecting the limit of the motion of the output end of the clutch and discontinuing the supply of electric current to the actuator upon detection of the limit. Since the detection of the lower limit of the stroke of the actuator for decelerating the vehicle is necessary for preventing unnecessary supply of electric current to the actuator and overloading of the actuator, the closed state of the limit switch is tested by supplying an electric current to the actuator so as to decelerate the vehicle prior to starting the normal operation of the vehicle cruise control and determining if the electric current is indeed conducted through the actuator or not.

7 Claims, 3 Drawing Sheets

CRUISE CONTROL SYSTEM

TECHNICAL FIELD

The present invention relates to a cruise control system provided with an actuator for acting upon vehicle speed control means, such as a throttle valve, in order to maintain the speed of a vehicle at a desired, fixed level, and in particular, to such a cruise control system having a limit switch for detecting the limit of the motion of the actuator in the direction to decelerate the vehicle and, in addition, diagnosis means for checking the limit switch for any failure.

BACKGROUND OF THE INVENTION

Various forms of cruise control systems are known. For instance, a copending U.S. patent application Ser. No. 129,257, filed Dec. 7, 1987, discloses such a cruise control system having improved self diagnosis features. In a typical cruise control system, once the set switch is pressed after the vehicle speed has reached a desired level as selected by the driver by appropriately depressing an accelerator pedal, an actuator under the control of a control system takes over the control of the accelerator pedal and adjusts the depression of the accelerator pedal so as to maintain the set speed of the vehicle from then on without requiring any effort from the driver.

Such an actuator may consist of a vacuum actuator deriving its power from the vacuum in the intake manifold of an internal combustion engine or, alternatively, of an electric motor provided with an electromagnetic clutch. An actuator consisting of an electric motor has an advantage of compactness and accuracy of control. However, supply of electric power to the motor should be discontinued when the throttle valve is fully closed, not only for avoiding the waste of electric power but also for preventing the overloading of the electric motor which might impair the durability of the electric motor. This can be easily accomplished by providing a limit switch which detects the state of the actuator corresponding to the fully closed state of the throttle valve and terminating the supply of electric power to the motor when the limit of the decelerating action of the actuator has been detected by this limit switch.

Since the soundness of this limit switch is important in view of the fact that the electric motor would be placed in an unexpected overload condition, should the limit switch fail to detect the fully closed state of the throttle valve, a certain measure must be taken to prevent any ill effects which might arise as a result of a faulty action of the limit switch. Furthermore, since the limit of the deceleration stroke of the actuator serves as a reference point in controlling the action of the actuator, any failure in this limit switch could cause an undesirable faulty behavior of the actuator.

BRIEF SUMMARY OF THE INVENTION

In view of such problems of the prior art, a primary object of the present invention is to provide a cruise control system which is capable of checking if the limit switch for detecting the limit of the deceleration stroke of an actuator of a cruise control system is in good order or not.

A second object of the present invention is to positively prevent the supply of abnormal electric current to an actuator for controlling the speed of the vehicle when it is detected that the limit switch for detecting the limit of the deceleration stroke of the actuator has failed to function properly.

A third object of the present invention is to provide a cruise control system which is capable of diagnosing the limit switch for detecting the limit of the deceleration stroke of an actuator of a cruise control system without affecting the normal operation of the cruise control system.

These and other objects of the present invention can be accomplished by providing a vehicle cruise control system, comprising: a control circuit for producing a control signal for maintaining a speed of a vehicle at a fixed level according to a difference between an actual vehicle speed and a target vehicle speed; a driver circuit for producing a drive current for selectively driving an actuator for acting upon vehicle speed control means of said vehicle in a direction either to accelerate said vehicle or to decelerate said vehicle according to said control signal from said control circuit; disabling means for disabling said actuator; and restoring means for restoring said vehicle speed control means to a neutral state when said actuator is disabled, further comprising: current detecting means for detecting said drive current supplied to said actuator; and self diagnosis means for supplying a test control signal for decelerating said vehicle to said driver circuit, and canceling the operation of said cruise control system if said drive current is detected by said current detecting means when said test control signal is supplied to said driver circuit.

Thereby, a faulty, permanently closed state of the limit switch can be accurately detected and the above mentioned problems arising from a faulty limit switch can be avoided.

According to a certain aspect of the present invention, the test control signal for decelerating the vehicle is supplied to the driver circuit prior to initiating a normal operation of the cruise control system. Preferably, the normal operation of the cruise control system is initiated by a trailing edge of the pulse produced by a set switch, and the self diagnosis means supplies the test control signal for decelerating the vehicle to the driver circuit after detecting a leading edge of the pulse produced by the set switch. Thereby, the self diagnosis is performed before the start of the normal operation of the cruise control system without causing any noticeable interruption to its operation.

According to a preferred embodiment of the present invention, the driver circuit comprises a transistor bridge and the current detecting means is interposed in a grounding line of the transistor bridge. Further, the actuator comprises an electric motor and the disabling means comprises an electromagnetic clutch interposed in a working end of the motor. Thus, it is made possible to perform a comprehensive self diagnosis routine for checking the electromagnetic clutch, the driver circuit and the limit switch for any failure, and the reliability of the system can be very much improved.

BRIEF DESCRIPTION OF THE DRAWINGS

Now the present invention is described in the following in terms of a particular embodiment with reference to the appended drawings, in which.

DETAILED DESCRIPTION OF THE PREFERRED EMBODIMENTS

Figure 1:
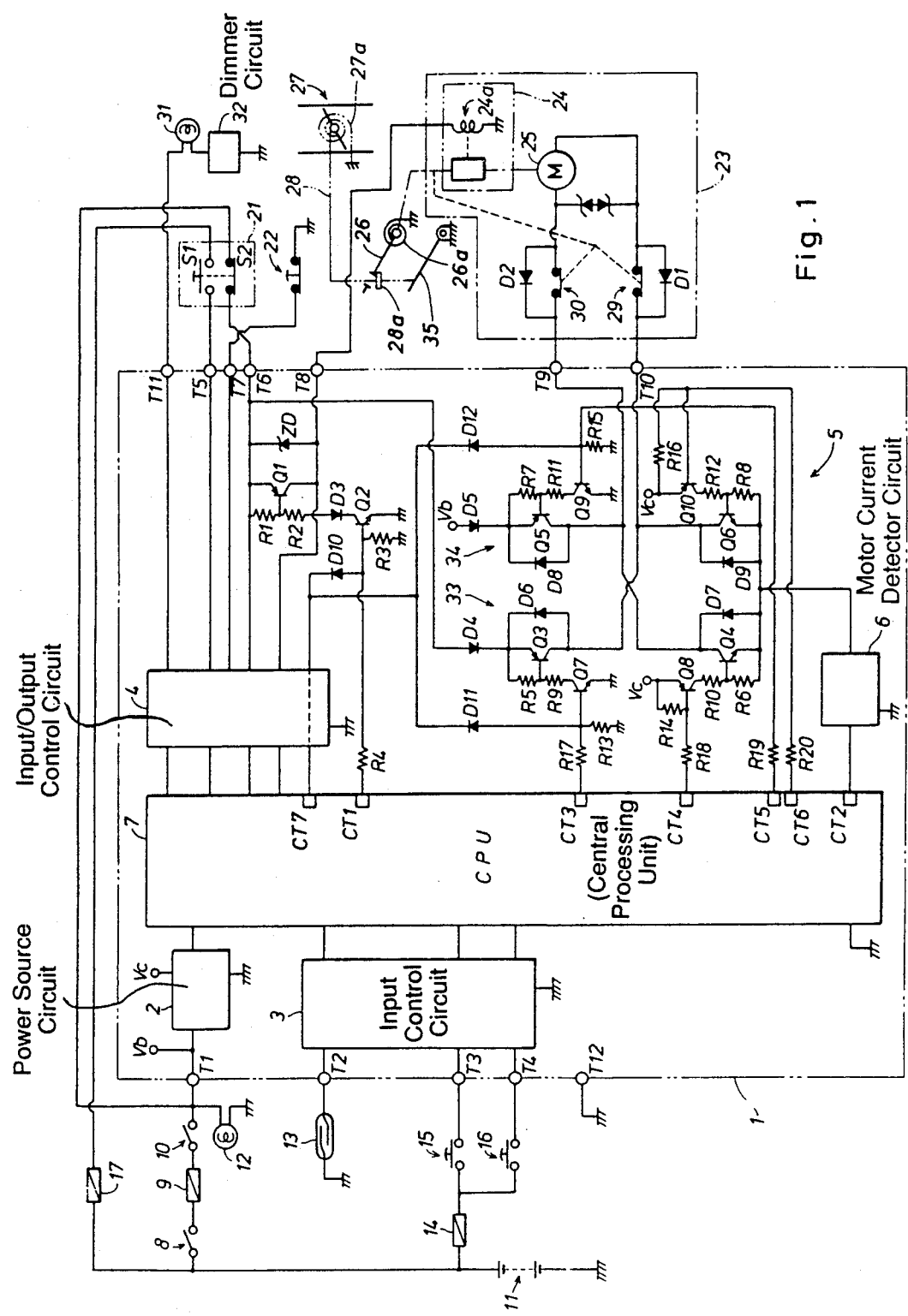
FIG. 1 is a circuit diagram of an embodiment of the cruise control system according to the present invention.

FIG. 1 is a circuit diagram of a cruise control system according to the present invention. The operation of this system is governed by a control unit 1 which comprises a power source circuit 2, an input control circuit 3, an input/output control circuit 4, an actuator driver circuit 5, a motor current detector circuit 6, and a central processing unit (CPU) 7.

The control unit 1 receives a supply of electric power from a battery 11 by way of an ignition switch 8, a fuse 9, a main switch 10 and a terminal T1. The terminal T1 is connected to the power source circuit 2 which is internally provided with a power regulator which stabilizes the voltage of the electric power supplied to the CPU 7. An unregulated power terminal Vb and a regulated power terminal Vc are provided between the terminal T1 and the power source circuit 2 and out from the power source circuit 2, respectively, for supplying electric power to other parts of the cruise control system. A main lamp 12 is connected across the ground and the node between the power switch 10 and the terminal T1. The input control circuit 3 is connected to a vehicle speed sensor 13 by way of a terminal T2 as well as to a set switch 15 and a resume switch 16 by way of terminals T3 and T4, respectively. The other ends of the set switch 15 and the resume switch 16 are connected to the battery 11 by way of a fuse 14.

The control unit 1 receives, by way of terminals T5 and T6, respectively, as its control inputs, signals from a normally open contact set S1 and a normally closed contact set S2 of a brake switch 21 which is associated with a brake pedal not shown in the drawings. The normally open contact set S1 is connected to the battery 11 by way of a fuse 17 while the normally closed contact set S2 is connected to the same end of the power switch 10 at the terminal T1. Further, a clutch switch 22 consisting of a normally closed contact set and attached to a clutch pedal (not shown in the drawings) is also connected to the control unit 1 by way of a terminal T7.

A terminal T8 of the control unit 1 is connected to a solenoid 24a of an electromagnetic clutch 24 connected to an output shaft of an electric motor 25 serving as a drive source of the actuator 23 for this cruise control system. The other end of this solenoid 24a is directly grounded. Terminals T9 and T10 are connected to the two ends of the electric motor 25 by way of contact sets of limit switches 29 and 30 which are described hereinafter.

The output end of the electromagnetic clutch 24 is connected to a control lever 26 for controlling the opening angle of a throttle valve 27 by way of a throttle wire 28. The control lever 26 as well as the throttle valve 27 are normally biased by springs 26a and 27a so as to close the throttle valve 27. As illustrated in FIG. 1, the control lever 26 is capable of pulling the throttle wire 28 by way of a knot 28a formed in the throttle wire 28 in the direction to open the throttle valve 27. When a throttle pedal 35 is depressed, the throttle wire 28 is pulled in the direction to open the throttle valve 27 without interfering with the control lever 27. However, when the control lever 26 is driven by the actuator 23 so as to pull the throttle wire 28, throttle pedal 35 gets depressed by by way of the throttle wire 28.

The motor 25 is powered by the drive current which is supplied from the terminals T9 and T10 and its rotational direction is determined by the polarity of the electric current supplied to the motor 25. The electromagnetic clutch 24 is interposed in the output shaft of the motor 25 and selectively disconnects the output shaft of the motor 25 from the control lever 26. Since the control lever 26 is spring biased, whenever the clutch 24 is disconnected, the throttle valve 27 returns to its fully closed position provided that the accelerator pedal 25 is not depressed, for instance by a foot of the driver.

The normally closed contact set interposed between the terminal T9 and the motor 25 belongs to the limit switch 29 for detecting the limit of the accelerating stroke of the motion of the actuator 23. A diode D1 for permitting the flow of electric current to drive the motor 25 in the direction to decelerate the vehicle is connected across this contact set. The normally closed contact set interposed between the terminal T10 and the motor 25 belongs to the limit switch 30 for detecting the limit of the decelerating stroke of the motion of the actuator 23. A diode D2 for permitting the flow of electric current to drive the motor 25 in the direction to accelerate the vehicle is likewise connected across this contact set, In other words, when the throttle valve 27 connected to the output end of the electromagnetic clutch 24 is fully closed or fully opened, the limit switch 29 or 30, as the case may be, is opened, and the supply of electric current to the motor 25 is discontinued. The diodes D1 and D2 are required to move the actuator away from its limits.

Further, one end of a cruise lamp 31 for indicating the enabled state of the cruise control system is connected to a terminal T11 of of the control unit 1 while its other end is grounded by way of a known dimmer circuit 32 which controls the brightness of the lamp 31 depending on whether the head lamps of the vehicle are turned on or not. The terminal T12 is a ground terminal of the control unit 1.

Now the internal structure of the control unit 1 is described in the following.

The terminals T5 through T8 and T11 are connected to the CPU 7 by way of the input/output control circuit 4. The terminal T6 is further connected to the emitter of a power transistor Q1 and the collector of this transistor is connected to the terminal T8 for supplying electric current to the solenoid 24a of the electromagnetic clutch 24. The emitter and the collector of the transistor Q1 are both connected to the input/output control circuit 4 for detecting the energized state of the solenoid 24a, and a zener diode ZD is connected across them. The emitter of the transistor Q1 is connected to the collector of a transistor Q2 by way of a pair of serially connected resistors R1 and R2 and a diode D3. The node between the resistors R1 and R2 is connected to the base of the transistor Q1. The diode D3 permits the flow of electric current from the transistor Q1 to the transistor Q2. The base of the transistor Q2 is connected to a terminal CT1 of the CPU 7 by way of a resistor R4, and is grounded by way of another resistor R3. The base of the transistor Q2 is further connected to the input/output control circuit 4 by way of a diode D10.

The actuator driver circuit 5 consists of a transistor bridge circuit for driving the motor 25 in either direction according to the control signal from the CPU 7. This bridge circuit includes four power transistors Q3, Q4, Q5 and Q6 and four driver transistors Q7, Q8, Q9 and Q10, one for each of the power transistors. The transistors Q3 and Q4 form an acceleration driver circuit 33 while the transistors Q5 and Q6 form an deceleration driver circuit 34 as shown more clearly in FIG. 2.

The emitter of the transistor Q3 is connected to the cathodes of two diodes D4 and D6. The anode of the diode D4 is connected to the emitter of the transistor Q1 while the anode of the diode D4 is connected to the collector or the transistor Q3. The emitter of the transistor Q3 is also connected to the collector of the transistor Q7 by way of a pair of serially connected resistors R5 and R9. The node between the two resistors R5 and R9 is connected to the base of the transistor Q3. The collector of the transistor Q3 is connected to the terminal T10. The emitter of the transistor Q7 is directly grounded. The base of the transistor Q7 is connected to the node between a pair of transistors R17 and R13 which are connected across a terminal CT3 of the CPU 7 and the ground, and to the anode of a diode D11 whose cathode is connected to the cathode of the diode D10.

The collector of the transistor Q4 is connected to the terminal T9 of the control unit 1. A diode D7 is connected across the collector and the emitter of the transistor Q4. The emitter of the transistor Q8 is connected to the power source Vc and the base of the transistor Q8 is connected to a terminal CT4 of the CPU 7 by way of a resistor R18. A resistor R14 is connected across the emitter and the base of the transistor Q4. The collector of the transistor Q8 is connected to the emitter of the transistor Q4 by way of a pair of serially connected resistors R10 and R6, and the base of the transistor Q4 is connected to the node between the resistors R10 and R6. The emitter of the transistor Q4 is connected to a terminal CT2 of the CPU 7 by way of a motor current detection circuit 6.

The emitter of the transistor Q5 is connected to the cathodes of two diodes D5 and D8. The anode of the diode D5 is connected to the power source Vb while the anode of the diode D8 is connected to the collector of the transistor Q5. The emitter of the transistor Q5 is also connected to the collector of the transistor Q11 by way of a pair of serially connected resistors R7 and R11. The node between the two resistors R7 and R11 is connected to the base of the transistor Q5. The collector of the transistor Q5 is connected to the terminal T9. The emitter of the transistor Q11 is directly grounded. The base of the transistor Q11 is connected to the node between a pair of transistors R19 and R15 which are connected across a terminal CT5 of the CPU 7 and the ground, and to the anode of a diode D12 whose cathode is connected to the cathode of the diode D10.

The collector of the transistor Q6 is connected to the terminal T10 of the control unit 1. A diode D9 is connected across the collector and the emitter of the transistor Q6. The emitter of the transistor Q10 is connected to the power source Vc, and the base of the transistor Q10 is connected to a terminal CT6 of the CPU 7 by way of a resistor R20. A resistor R16 is connected across the emitter and the base of the transistor Q10. The collector of the transistor Q10 is connected to the emitter of the transistor Q5 by way of a pair of serially connected resistors R12 and R8, and the base of the transistor 06 is connected to the node between the resistors R12 and R8. The emitter of the transistor Q6 is connected to the terminal CT2 of the CPU 7 by way of the motor current detection circuit 6.

Thus, in this transistor bridge circuit, when the actuator 23 is to be driven in the direction to accelerate the vehicle, the acceleration driver circuit 33 is turned into a conductive state according to a control signal produced from the four output terminals CT3 through CT6 of the CPU 7. In other words, electric current is conducted from the collector of the transistor Q3 to the collector of the transistor Q4 by way of the terminal T10, the limit switch 29, the motor 25, the diode D2 and the terminal T9. Conversely, when the actuator 23 is to be driven in the direction to decelerate the vehicle, the deceleration driver circuit 34 is turned into a conductive state according to a control signal produced from the four output terminals CT3 through CT6 of the CPU 7. In other words, electric current is conducted from the collector of the transistor Q5 to the collector of the transistor Q6 by way of the terminal T9, the limit switch 30, the motor 25, the diode D1 and the terminal T10.

According to this embodiment of the control circuit for a cruise control system, since the electric power for the acceleration circuit 33 is derived from the terminal T6, the acceleration circuit 33 is positively deactivated from lack of electric power when the brake pedal of this vehicle is depressed and the contact set S2 of the brake switch 21 is thereby opened. At the same time, the supply of electric power to the transistor Q1 is also discontinued and the electromagnetic clutch 24 is disconnected. As a result, the throttle valve 27 returns to its fully closed position under the spring forces of the springs 26a and 27a provided to the control lever 26 and the throttle valve 24 itself, respectively. Thus, the action of the actuator 23 to accelerate the vehicle is positively prevented by these double safety measures.

The input/output control circuit 4 is incorporated with a watch dog timer circuit which grounds the cathodes of the diodes D10, D11 and D12 by way of a terminal CT7 when an abnormal state of the CPU 7 is detected. When the cathodes of the diodes D10, D11 and D12 are grounded, the power transistors Q1, Q3 and Q5 are all brought into non-conductive states because the corresponding driver transistors Q3, Q7 and Q9 are turned into non-conductive states.

Now the action of this cruise control system is described in the following.

When the ignition switch 8 and the main power switch 10 are both closed, electric power is supplied to the control unit 1 and it is indicated by the lighting up of the main lamp 12. When the set switch 15 is pressed and a set of certain conditions are satisfied (such that the vehicle is running at a speed higher than a certain threshold level; the brake pedal is not depressed; the clutch pedal is not depressed; and so on), the vehicle speed as detected by the speed sensor 13 is stored in the CPU 7 as a set speed or a target speed and the cruise lamp 31 lights up.

Thereafter, the CPU 7 controls the actions of the electromagnetic clutch 24 and the motor 25 so as to maintain the actual vehicle speed at the level of the set speed. For instance, if the actual vehicle speed is less than the set level by more than a certain margin, the terminals CT3 and CT4 are pulled up to high levels to bring the transistors Q3 and Q4 of the acceleration driver circuit 33 into conductive states while the terminals CT5 and CT6 are pulled down to low levels to bring the transistors Q5 and Q6 of the deceleration driver circuit 34 into non-conductive states. As a result, the motor 25 is driven in the direction to open the throttle valve 27 and accelerate the vehicle. On the other hand, if the actual vehicle speed is higher than the set level by more than a certain margin, the terminals CT3 and CT4 are pulled down to low levels to bring the transistors Q3 and Q4 of the acceleration driver circuit 33 into non-conductive states while the terminals CT5 and CT6 are pulled up to high levels to bring the transistors Q5 and Q6 of the deceleration driver circuit 34 into conductive states. As a result, the motor 25 is driven in the direction to close the throttle valve 27 and decelerate the vehicle.

In this way, the vehicle speed is maintained at the set speed level within a small margin of error. When the cruise control system is canceled for instance by depressing the brake pedal or the clutch pedal, or other canceling operation, the cruise control system is disabled and the cruise lamp 31 is turned off. However, by pressing the resume switch 16, the preceding set speed is restored and the cruise control is resumed.

When the cruise control is canceled, a deceleration signal is produced from the CPU 7 and drives the actuator driver circuit into decelerating the vehicle.

According to this embodiment, the failure of the deceleration limit switch 30 to close can be detected as described hereinafter.

Figure 3:
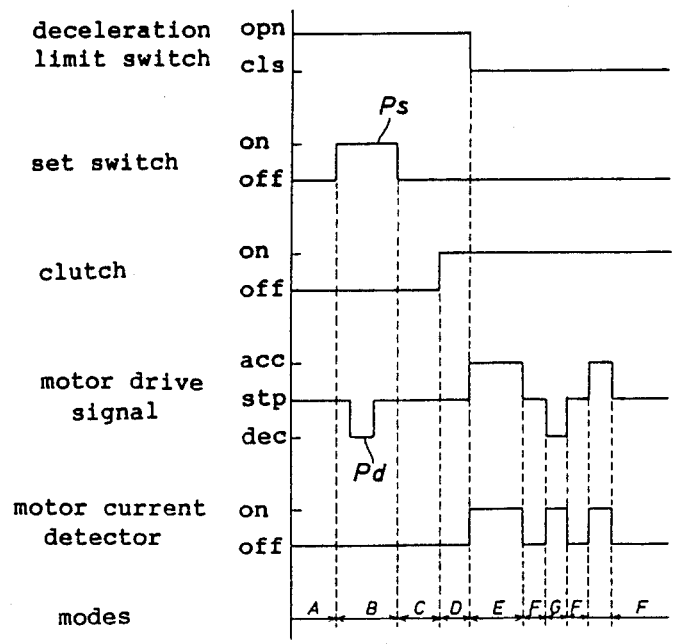
FIGS. 3 through 5 are time charts for illustrating the states of the various elements of the cruise control system in typical sequences of the operation of the cruise system, FIGS. 3 and 4 corresponding to the case where the limit switch is in good order while FIG. 5 corresponds to the case where the limit switch is permanently closed.
Figure 4:
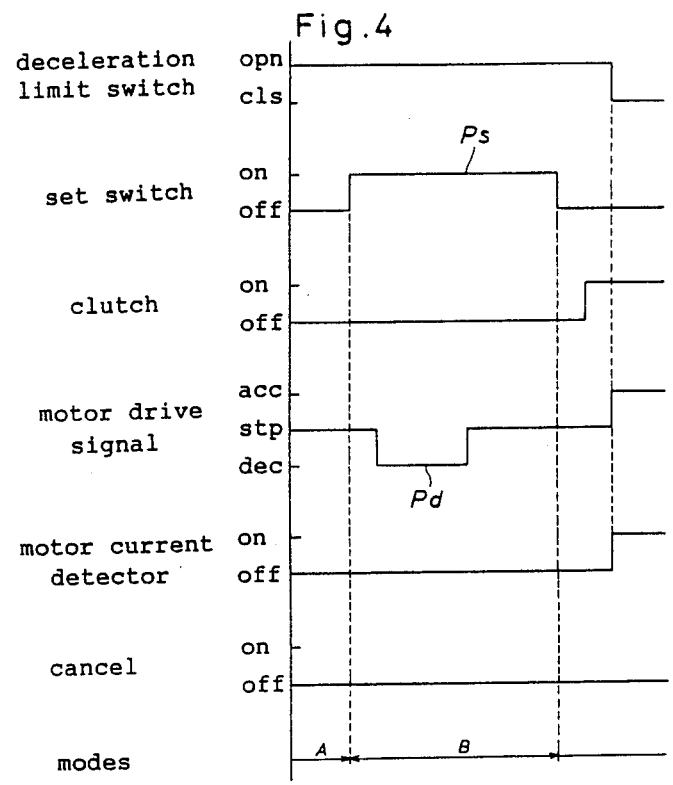

FIG. 3 is a time chart for illustrating the various modes of the action of the control circuit by showing the relationship between the actions of the deceleration limit switch 30, the set switch 15, the electromagnetic clutch 24, the electric motor 25, and the motor current detector circuit 6. FIG. 4 is a time chart similar to the one shown in FIG. 3 for illustrating the action of the system before and after the closing of the set switch 15 in greater detail, and this time chart further includes the state of the motor current detection circuit 6 as well as the state of a part of the CPU 7 related to the canceling process.

First of all, as shown in FIGS. 3 and 4, prior to the generation of a signal from the set switch 15 which produces a pulse (Ps) of a certain width, the electromagnetic clutch 24 is disconnected, the motor 25 is stationary, and the deceleration limit switch 30 is open because the control lever 26 is biased by the spring 26a into a neutral state or to the limit of the deceleration stroke (mode A). When the set switch 15 is pressed, a test drive signal or a deceleration drive signal (Pd) consisting of a pulse signal of a certain width is supplied from the CPU 7 to the driver circuit 5 by way of the terminals CT2 through CT6 after detecting the leading edge of the pulse (Ps) produced by the set switch 15 (mode B).

If the deceleration limit switch 30 is in good order and is therefore open, the drive current to the motor 25 is interrupted by the deceleration limit switch 30 and the drive current therefore does not flow through the motor 25. This is detected by the motor current detector circuit 6 and the CPU 7, and the normal operation of the cruise control system is started without involving any canceling action. In other words, the electromagnetic clutch 24 is connected following the detection of the trailing edge of the pulse (Ps) produced by the set switch 15, and the motor drive signal is produced as required by the control system to maintain the speed of the vehicle at a fixed level as shown in FIG. 3.

Figure 5:
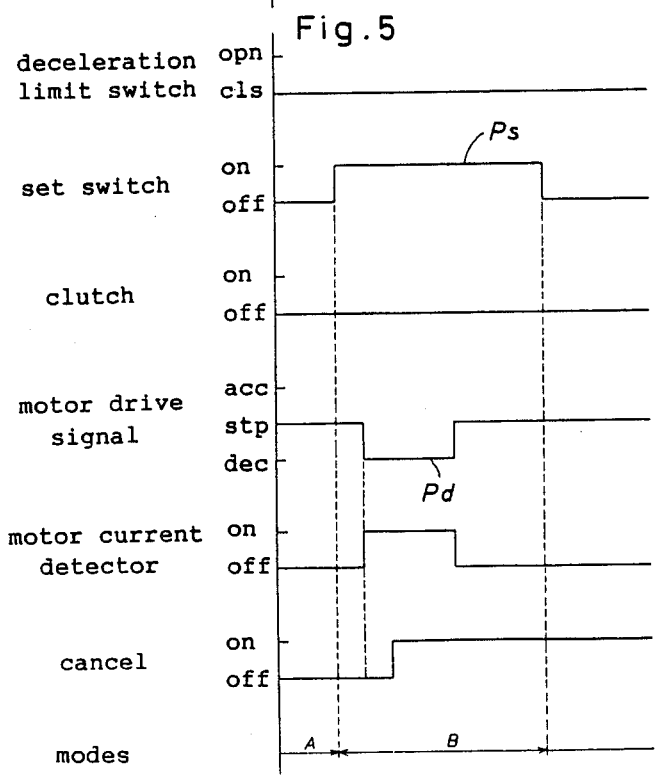

On the other hand, if the deceleration limit switch 30 is frozen to its closed state and is therefore permanently closed, since a complete loop of a conductive path for a deceleration drive current is formed through the deceleration driver circuit 34 for the motor 25, the limit switch 30, the diode D1 and the motor 25 itself, as long as the deceleration drive signal for the driver circuit 6 persists, the motor 25 keeps receiving a drive current, and it is detected by the motor current detector circuit 6. Upon detection of the high state of the motor current detector circuit 6, the CPU 7 determines that the deceleration limit switch 30 is faulty and kept closed when it should not, and produces a cancel signal for canceling the state of auto cruise. Therefore, as shown in FIG. 5, even after the pulse (Ps) produced by the set switch 15 has ceased to be high, the electromagnetic clutch 24 continues to be disconnected, and the setting of the state of auto cruise becomes impossible.

According to the present invention, it is possible to detect the permanently closed sate of the deceleration limit switch 30 by producing a test signal consisting of a deceleration drive signal while the main switch 10 is still on. Further, by forming an AND circuit for the signal from the main switch and the deceleration limit switch 30 as a circuit for lighting up the main lamp 12, the permanently closed state of the deceleration limit switch 30 can be indicated by turning off the main lamp when this faulty state is detected, so as to permit easy visual recognition.

Further, according to this control circuit, signals for turning on the power transistors Q1, Q3 through Q6 are produced at the terminals CT1, CT3 through CT6, and a self-diagnosis circuit incorporated in the CPU 7 determines the conductive state of the circuit according to the signal supplied to the terminal CT2. This self diagnosis circuit evaluates the soundness of each of the power transistors Q1, Q3 through Q6 during the cruise control system is in a certain state.

Figure 2:
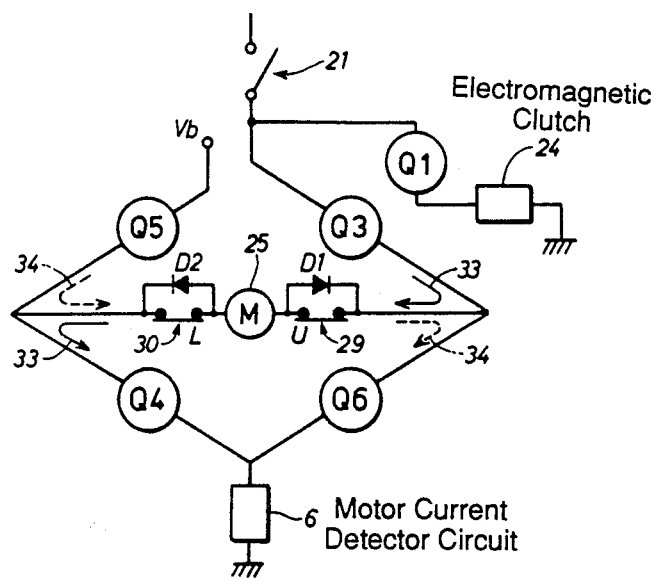
FIG. 2 is a simplified circuit diagram of the driver circuit shown in FIG. 1.

For instance, as shown in FIG. 3 taken in conjunction with FIG. 2, in mode A, the permanently closed states of the transistors Q4 and Q6 can be determined by turning on the transistor Q3. If any abnormal condition is detected by this self diagnosis circuit, the CPU 7 disables the cruise control system.

After the signal from the set switch 15 has returned to the low level and before the electromagnetic clutch 24 is connected (mode C), the permanently closed state of the transistor Q1 can be detected by turning off the transistor Q1. When the electromagnetic clutch 24 is connected but the motor 25 is still stationary (mode D), the permanently open state of the transistor Q1 and the permanently closed state of the transistor Q3 can be detected by turning on the transistors Q1 and Q4, respectively.

During the initialization process during which the motor 25 is driven in the direction to accelerate the vehicle for the purpose of removing a slack in the linkage between the control lever 26 and the throttle valve 27 (mode E), the permanently open states of the transistors Q1, Q3 and Q4 can be detected by turning on these transistors, respectively. When the state of auto cruise has already been accomplished and the motor 25 happens to be stationary (mode F), the permanently open state of the transistor Q1 and the permanently closed states of the transistors Q1 and Q6 can be detected by turning on the transistors Q1 and Q6, respectively, while the permanently open state of the transistor Q1 and the permanently closed states of the transistors Q4 and Q6 can be detected by turning on the transistors Q1 and Q5, respectively.

When the state of auto cruise has already set in and the motor 25 is being driven in the direction for deceleration (mode G), the open states of Q1, Q5 and Q6 can be detected by turning on these transistors Q1, Q5 and Q6, respectively.

When any of these abnormal states is detected by the self diagnosis circuit within the CPU 7, the CPU 7 immediately cancels the state of auto cruise.

What we claim is:

1. A vehicle cruise control system, comprising:
 a control circuit for producing a control signal for maintaining a speed of a vehicle at a fixed level according to a difference between an actual vehicle speed and a target vehicle speed;
 a driver circuit for producing a drive current for selectively driving an actuator for acting upon vehicle speed control means of said vehicle in a direction either to accelerate said vehicle or to decelerate said vehicle according to said control signal from said control circuit;
 a limit switch for detecting a limit of a deceleration stroke of said vehicle speed control means; a disabling means for disconnecting a path of supplying said drive current from said driver circuit to said actuator upon detection of said limit;
 current detecting means for detecting said drive current supplied to said actuator;
 self diagnosis means connected to receive said drive current for supplying a test control signal for moving said actuator to drive said vehicle speed control means to said limit of the deceleration stroke to said driver circuit, and canceling the operation of said cruise control system if said test control signal has failed to cause said limit switch to detect said limit of the deceleration stroke.

2. A vehicle cruise control system as defined in claim 1, wherein said test control signal is supplied to said driver circuit prior to initiating an operation of said cruise control system.

3. A vehicle cruise control system as defined in claim 2, further comprising a set switch for producing a pulse, the operation of said cruise control system being initiated by a trailing edge of said pulse produced by said set switch, and said self diagnosis means supplying said test control signal to said driver circuit after detecting a leading edge of said pulse produced by said set switch.

4. A vehicle cruise control system as defined in claim 1, wherein said driver circuit comprises a transistor bridge, and said current detecting means is interposed in a grounding line of said transistor bridge.

5. A vehicle cruise control system as defined in claim 4, wherein said actuator comprises an electric motor, and said disabling means comprises an electromagnetic clutch connected to an output shaft of said motor.

6. A vehicle cruise control system as defined in claim 5, further comprising means for urging forcing said vehicle speed control means to said limit of the deceleration stroke.

7. A vehicle cruise control system as defined in claim 6, wherein said means for urging forcing comprises a spring.

* * * * *